(12) United States Patent
Zhong

(10) Patent No.: US 9,946,083 B2
(45) Date of Patent: Apr. 17, 2018

(54) REFLECTIVE MOBILE PHONE CINEMA LENS

(71) Applicant: Lei Zhong, Shenzhen (CN)

(72) Inventor: Lei Zhong, Shenzhen (CN)

(*) Notice: Subject to any disclaimer, the term of this patent is extended or adjusted under 35 U.S.C. 154(b) by 0 days.

(21) Appl. No.: 15/120,906

(22) PCT Filed: May 31, 2015

(86) PCT No.: PCT/CN2015/080445
§ 371 (c)(1),
(2) Date: Aug. 23, 2016

(87) PCT Pub. No.: WO2015/188707
PCT Pub. Date: Dec. 17, 2015

(65) Prior Publication Data
US 2016/0363776 A1    Dec. 15, 2016

(30) Foreign Application Priority Data

Jun. 10, 2014   (CN) .......................... 2014 1 0257466

(51) Int. Cl.

| | |
|---|---|
| *G02B 27/14* | (2006.01) |
| *G02B 27/10* | (2006.01) |
| *G02B 5/10* | (2006.01) |
| *G02B 17/06* | (2006.01) |
| *G02B 27/02* | (2006.01) |
| *G02B 27/22* | (2018.01) |
| *G02B 27/01* | (2006.01) |

(52) U.S. Cl.
CPC .......... *G02B 27/1066* (2013.01); *G02B 5/10* (2013.01); *G02B 17/06* (2013.01); *G02B 27/0172* (2013.01); *G02B 27/027* (2013.01); *G02B 27/144* (2013.01); *G02B 27/2235* (2013.01); *G02B 2027/0134* (2013.01); *G02B 2027/0136* (2013.01)

(58) Field of Classification Search
CPC ...... G02B 27/1066; G02B 5/10; G02B 17/06; G02B 27/0172; G02B 27/027; G02B 27/144; G02B 27/2235
USPC .................................. 359/629–632
See application file for complete search history.

(56) References Cited

U.S. PATENT DOCUMENTS 5,886,823 A * 3/1999 Sugano .............. G02B 27/0018
359/630

* cited by examiner

*Primary Examiner* — James Greece
(74) *Attorney, Agent, or Firm* — Novoclaims Patent Services LLC; Mei Lin Wong

(57) ABSTRACT

A reflective mobile phone lens, comprising a semi-permeable semi-reflecting mirror (5), a concave spherical reflecting mirror (4) and a mobile phone (1) screen; the mobile phone (1) screen serves as a display screen to display an image; light passes through the semi-permeable semi-reflecting mirror (5) and arrives at the concave spherical reflecting mirror (4), and then is reflected by the concave spherical reflecting mirror (4) back to the semi-permeable semi-reflecting mirror (5), and is reflected by the reflective surface of the semi-permeable semi-reflecting mirror (5) onto the mobile phone (1) screen. The mobile phone lens enables watching an online movie or playing a virtual reality game on the mobile phone (1) to have a good effect like watching a movie on a big screen in a cinema.

9 Claims, 3 Drawing Sheets

REFLECTIVE MOBILE PHONE CINEMA LENS

BACKGROUND OF THE INVENTION

Technical Field

The present invention relates to an optical magnifying device, in particular to a device for magnifying a mobile phone screen.

Description of Related Art

With technological development, mobile phone display screen pixel resolutions are becoming higher and higher, and pixel resolution for a screen as small as about five inches is 1920*1080, sometimes reaching 2560*1440 and can even be developed to 4K ultra-high definition pixel resolution which is 3840*2160. The pixel resolution of small screens is the same as that of the most advanced large television, and the pixel density has already exceeded the human eye's recognition range. An online video can be watched on a mobile phone quite conveniently, the economic efficiency is quite high, and the advantages of being private and not affecting other people and the advantages which cannot be achieved by a large television are also achieved. However, not only is the definition requirement needed when people watch movies, but also the shock brought by large-breadth IMAX is needed, and details which cannot be clearly seen with the naked eye also need to be recognized, so that the problem of narrow width still exists when movies are watched on a mobile phone.

BRIEF SUMMARY OF THE INVENTION

In order to overcome the defect, the present invention provides a reflective mobile phone lens according to which a concave spherical reflecting mirror is used for magnifying a mobile phone screen.

According to the technical scheme adopted by the present invention for solving the technical problem, a mobile phone serves as the display component of the device, light passes through a semi-permeable semi-reflecting mirror which is in front of the eyes and oblique relative to the light, arrives at a concave spherical reflecting mirror or a concave non-spherical reflecting mirror which is opposite the eyes, then is reflected by the concave spherical reflecting mirror back to the semi-permeable semi-reflecting mirror, and is reflected by the reflective surface of the semi-permeable semi-reflecting mirror onto the mobile phone screen placed above the semi-permeable semi-reflecting mirror.

The present invention has the beneficial effects of the mobile phone lens which is formed by a concave spherical reflecting mirror method is small in size and low in weight, avoids the problem of chromatic aberration of a convex lens, avoids the shrinkage problem which cannot be solved by an injection-molded convex lens, and avoids the weight problem caused by the thickness of a large convex lens. Advanced mobile phone equipment is adopted by the lens, not only is the entertainment enjoyment of an IMAX huge-screen cinema or a virtual reality game brought to people, but also a piece of image displaying or high-end monitoring equipment which can be used for meeting certain working and studying requirements can be constructed for people easily.

In FIGS: 1 mobile phone, 2 eyepiece magnifying lens, 3 magnifying lens, 4 single-concave-spherical lens, 5 semi-permeable semi-reflecting mirror, 6 double-concave-spherical reflecting mirror, 7 3D isolating light barrier.

DETAILED DESCRIPTION OF THE INVENTION

1. A Light Path of an Ordinary 2D Image is Magnified

Figure 1:
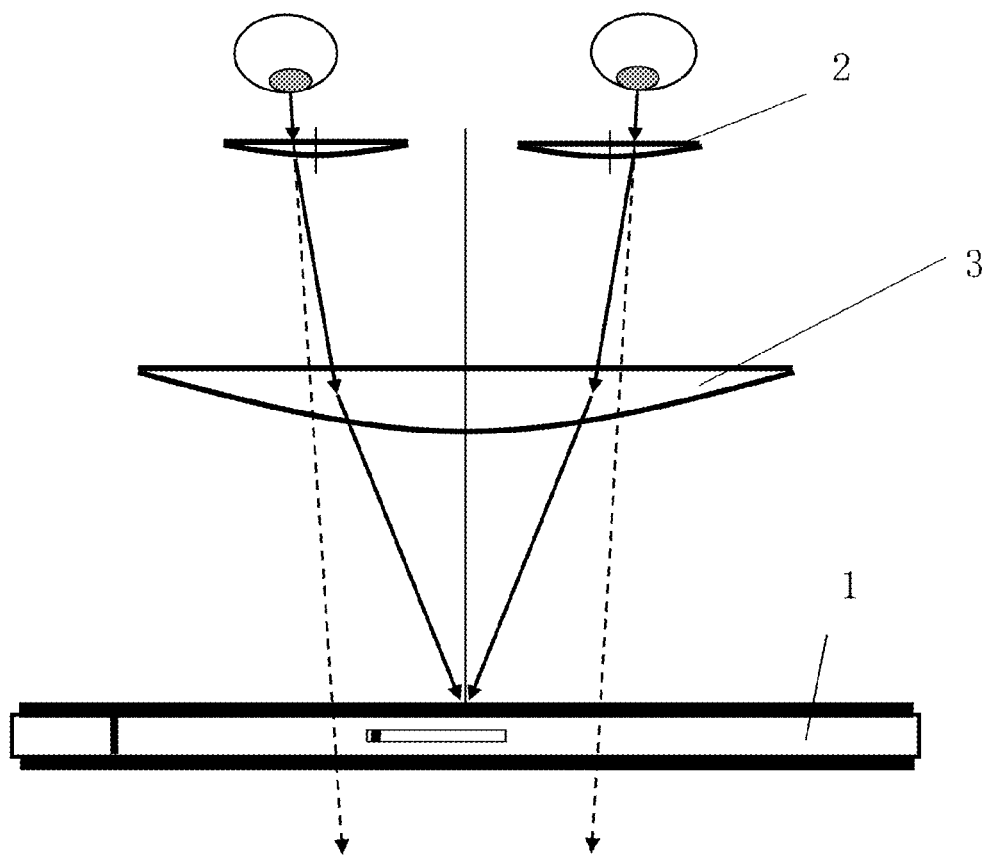
FIG. 1 is an equivalent light path diagram of an ordinary 2D image.
Figure 2:
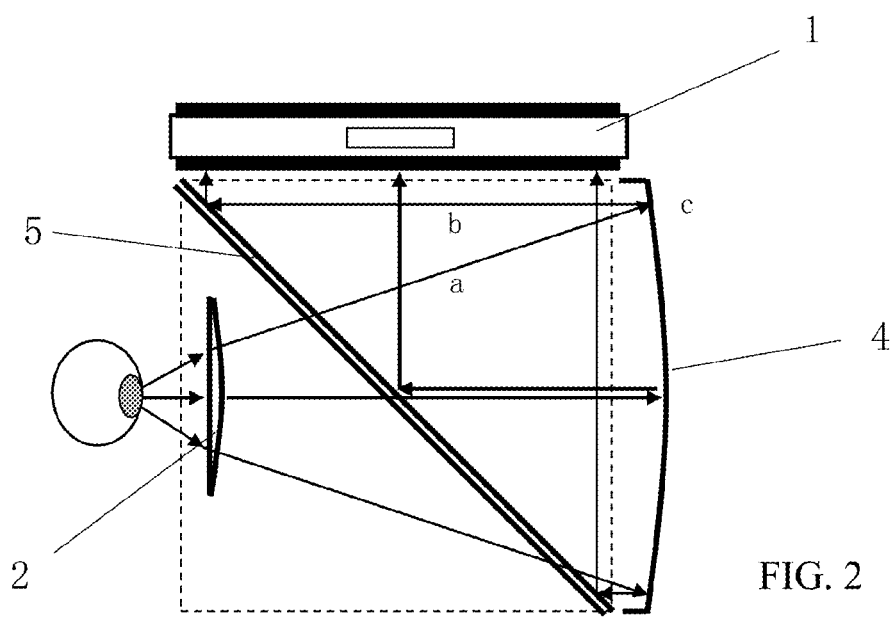
FIG. 2 is a light path diagram of a concave spherical reflecting mirror magnifying device.
Figure 3:
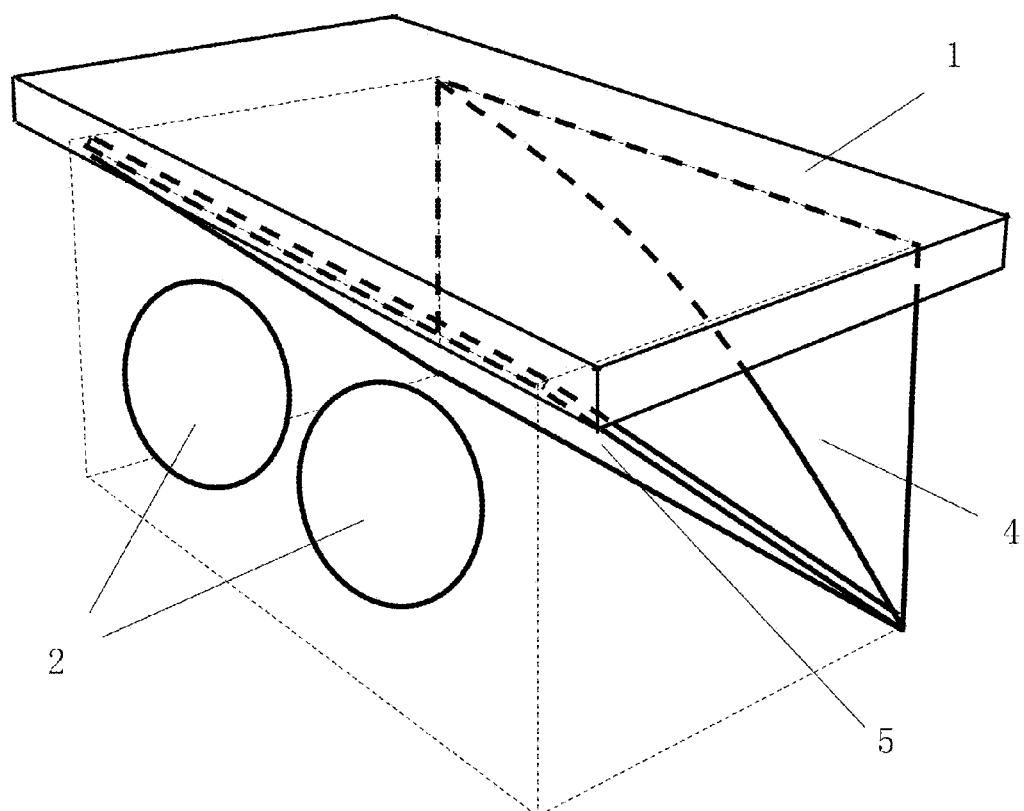
FIG. 3 is a stereoscopic diagram of an ordinary 2D image magnifying device.
Figure 4:
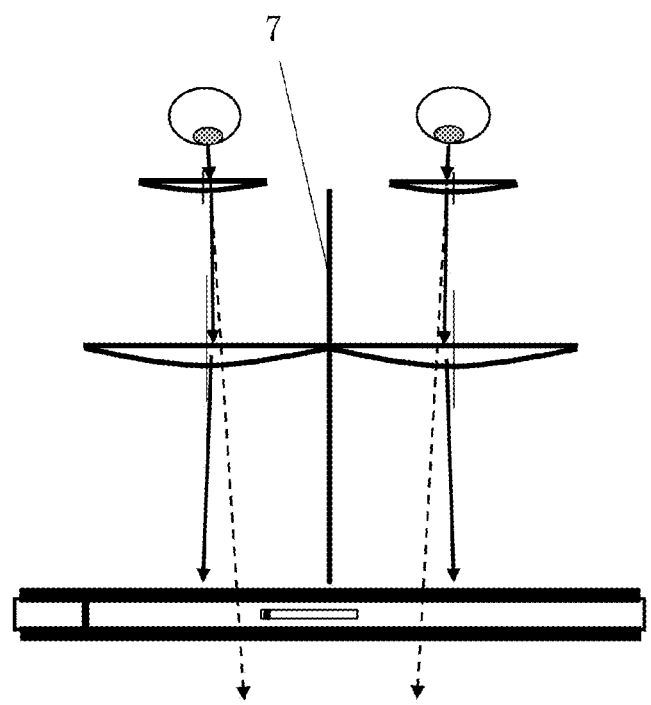
FIG. 4 is an equivalent light path diagram of a 3D magnifying device.

Light is reflected by the same semi-permeable semi-reflecting mirror (5) onto the same single-concave-spherical reflecting mirror (4) (FIG. 2 and FIG. 3), and the light is reflected back by a concave spherical reflecting mirror and then reflected by the reflective surface of the semi-permeable semi-reflecting mirror onto a mobile phone (1) screen. An equivalent magnifying lens (3) (FIG. 1) based on the magnifying principle of the concave spherical reflecting mirror is arranged, a two-eye light path equivalent diagram 1 is provided, and an eyepiece magnifying lens (2) in the diagram slightly deviates from the light towards the middle, so that the uncomfortable feeling of cross-eye people is avoided. The eyepiece magnifying lens also has the function of enlarging the field of view, and the magnified breadth (FIG. 2) can be increased.

2. 3D Light Path

Figure 5:
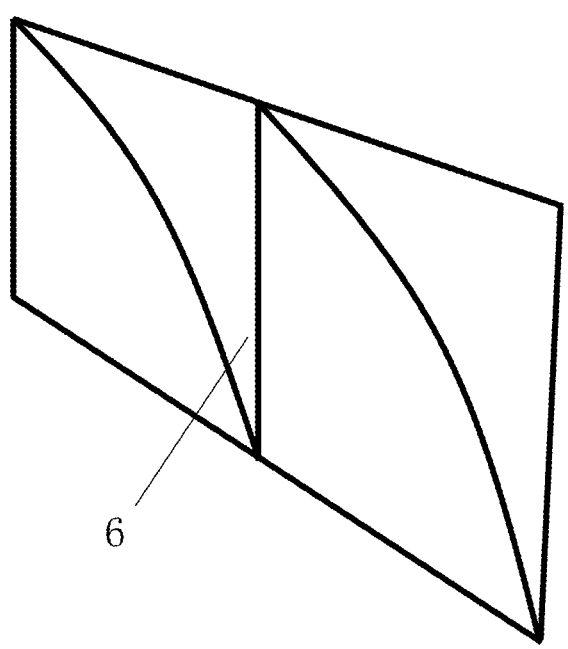
FIG. 5 is a concave spherical reflecting mirror for 3D purpose.

Light is reflected by the semi-permeable semi-reflecting mirror to the corresponding concave spherical reflecting mirror bodies (the equivalent diagram 4) of a double-concave-spherical reflecting mirror (6) respectively, and the light is reflected back by the concave spherical reflecting mirror bodies and then reflected by the reflective surface of the semi-permeable semi-reflecting mirror onto a left image and a right image, being parallax, displayed by the mobile phone screen. A 3D isolating light barrier (7) is arranged between light paths of the two eyes for isolation, and a two-eye light path equivalent diagram 4 is provided. In the diagram, two eyepiece magnifying lenses slightly deviate towards the two ends, so that the situation where the distance between the center of the left parallax image and the center of the right parallax image being larger than the pupil distance between the two eyes is avoided. The double-concave-spherical reflecting mirror (6) is formed by assembling the two concave spherical reflecting mirror bodies together in the left-right direction (FIG. 5), the area of the assembled concave spherical reflecting mirror bodies is as large as the area of two 2D single-concave-spherical reflecting mirrors (4) so that the concave spherical reflecting mirror bodies and the 2D single-concave-spherical reflecting mirrors (4) can be interchanged in a device, and both the 2D purpose and the 3D purpose are achieved through the detachable 3D isolating light barrier.

3. Concave Spherical Reflecting Mirror

The concave spherical reflecting mirror can be a single-concave-spherical reflecting mirror or a double-concave-spherical reflecting mirror, the spherical curvature of the single-concave-spherical reflecting mirror is consistent with the spherical curvature of the double-concave-spherical reflecting mirror, the area of the single-concave-spherical reflecting mirror and the area of the double-concave-spherical reflecting mirror are the same and consistent with the area of a fixed interface of a lens device, and interchange of the 2D purpose and the 3D purpose is achieved. The concave spherical reflecting mirror includes a concave non-spherical reflecting mirror used for phase difference correction.

4. Light Path Design

The light path design is conducted with a square as a frame (FIG. 2), and the width of the mobile phone screen which is prepared to be adopted serves as the norm of the side length of the square. The concave spherical reflecting mirror is arranged opposite to the eyes, and the height of the concave spherical reflecting mirror is also basically equal to that of the square frame. The semi-permeable semi-reflecting mirror is arranged along the diagonal line of the square, and the long side of the semi-permeable semi-reflecting mirror is basically equal to the length of the mobile phone screen. The positions of the eyes are made to approach the concave spherical reflecting mirror to the maximum extent, so that a light path which is as short as possible is obtained. The curvature (c) of the concave spherical reflecting mirror is based on the norm where the incident light (a), emitted from an eyepiece in the diagram for seeing the edge of the screen is parallel to the reflected-out emergent light (b), and the remaining focal length can be matched and corrected by means of the eyepiece magnifying lens.

What is claimed is:

1. A reflective mobile phone lens adapted for use with a mobile phone, comprising a semi-permeable semi-reflecting mirror, a concave spherical reflecting mirror and an eyepiece magnifying lens, wherein light is guided to pass through the semi-permeable semi-reflecting mirror which is oblique relative to the light, to arrive at the concave spherical reflecting mirror then the light is reflected by the concave spherical reflecting mirror back to the semi-permeable semi-reflecting mirror, and is reflected by the reflective surface of the semi-permeable semi-reflecting mirror onto a mobile phone screen, wherein a square frame is defined by the mobile phone, the semi-permeable semi-reflecting mirror and the concave spherical reflecting mirror, wherein a length of a side of the square frame is identical to a width a screen of the mobile phone, a height of the concave spherical reflecting mirror is equal to the length of the side of the square frame, wherein the semi-permeable semi-reflecting mirror is positioned along a diagonal line of the square frame, wherein a long side of the semi-permeable semi-reflecting mirror is equal to a length of the mobile phone screen, wherein a curvature of the concave spherical reflecting mirror is based on a norm where an incident light emitted from an eyepiece from edges of the screen of the mobile phone is parallel to an emergent light reflected from the concave spherical reflecting mirror, wherein a focal length is set by means of the eyepiece magnifying lens.

2. The reflective mobile phone lens according to the claim 1, wherein the concave spherical reflecting mirror is a single-concave-spherical reflecting mirror.

3. The reflective mobile phone lens according to the claim 1, wherein the concave spherical reflecting mirror is a double-concave-spherical reflecting mirror, wherein the double-concave-spherical reflecting mirror is composed of a left concave spherical reflecting mirror body and a right concave spherical reflecting mirror body which is identical to the left concave spherical reflecting mirror body, wherein the light reflecting back to the semi-permeable semi-reflecting mirror and is reflected by a reflective surface of the semi-permeable semi-reflecting mirror onto a left image and a right image, which is being parallax, to the screen of the mobile phone, wherein an isolating light barrier to stop light travelling between two light paths of two eyes.

4. The reflective mobile phone lens according to the claim 3, wherein the concave spherical reflecting mirror comprises a concave non-spherical reflecting mirror for phase difference correction.

5. The reflective mobile phone lens according to the claim 2, wherein the single-concave spherical reflecting mirror is switchable by a double-concave-spherical reflecting mirror, wherein the double-concave-spherical reflecting mirror is composed of a left concave spherical reflecting mirror body and a right concave spherical reflecting mirror body which is identical to the left concave spherical reflecting mirror body, wherein the light reflecting back to the semi-permeable semi-reflecting mirror and is reflected by a reflective surface of the semi-permeable semi-reflecting mirror onto a left image and a right image, which is being parallax, to the screen of the mobile phone, wherein an isolating light barrier to stop light travelling between two light paths of two eyes, wherein a size of the single-concave spherical reflecting mirror is equal to a size of the double-concave-spherical reflecting mirror.

6. The reflective mobile phone lens according to the claim 3, wherein the single-concave spherical reflecting mirror is switchable by a double-concave-spherical reflecting mirror, wherein the double-concave-spherical reflecting mirror is composed of a left concave spherical reflecting mirror body and a right concave spherical reflecting mirror body which is identical to the left concave spherical reflecting mirror body, wherein the light reflecting back to the semi-permeable semi-reflecting mirror and is reflected by a reflective surface of the semi-permeable semi-reflecting mirror onto a left image and a right image, which is being parallax, to the screen of the mobile phone, wherein an isolating light barrier to stop light travelling between two light paths of two eyes, wherein a size of the single-concave spherical reflecting mirror is equal to a size of the double-concave-spherical reflecting mirror.

7. A reflective mobile phone lens assembly adapted for use with a mobile phone, wherein the mobile phone has a screen and defines a width of the screen, comprising:
   a concave spherical reflecting mirror;
   two eyepiece magnifying lens; and
   a semi-permeable semi-reflecting mirror positioned between the concave spherical reflecting mirror and the two eyepiece magnifying lens,
   wherein a square frame having four equal sides is defined by the mobile phone, the semi-permeable semi-reflecting mirror and the concave spherical reflecting mirror, wherein a length of each of the sides of the square frame is equal to a width the screen of the mobile phone, a height of the concave spherical reflecting mirror is equal to the length of each of the sides of the square frame, wherein the semi-permeable semi-reflecting mirror is positioned along a diagonal line of the square frame, wherein a long side of the semi-permeable semi-reflecting mirror is equal to a length of the mobile phone screen, wherein a curvature of the concave spherical reflecting mirror is based on a norm where an incident light emitted from an eyepiece from edges of the screen of the mobile phone is parallel to an emergent light reflected from the concave spherical reflecting mirror, wherein a focal length is set by means of the eyepiece magnifying lens,
   wherein light is guided to pass through the semi-permeable semi-reflecting mirror which is oblique relative to the light and to arrive at the concave spherical reflecting mirror, then the light is reflected by the concave spherical reflecting mirror back to the semi-permeable semi-reflecting mirror and is reflected by a reflective surface of the semi-permeable semi-reflecting mirror onto the screen of the mobile phone, thereby when an image displayed by the screen of the mobile phone is viewed through the reflective mobile phone lens, the image is magnified without chromatic aberration.

8. A reflective mobile phone lens assembly according to claim 7, wherein the concave spherical reflecting mirror is a single-concave-spherical reflecting mirror, wherein the 2-dimensional image displayed by the screen of the mobile phone is magnified without chromatic aberration through the reflective mobile phone lens assembly.

9. The reflective mobile phone lens assembly according to the claim 7, wherein the concave spherical reflecting mirror is a double-concave-spherical reflecting mirror, wherein the double-concave-spherical reflecting mirror is composed of a left concave spherical reflecting mirror body and a right concave spherical reflecting mirror body which is identical to the left concave spherical reflecting mirror body, wherein the light reflecting back to the semi-permeable semi-reflecting mirror and is reflected by a reflective surface of the semi-permeable semi-reflecting mirror onto a left image and a right image, which is being parallax, to the screen of the mobile phone, wherein an isolating light barrier to stop light travelling between two light paths of two eyes, wherein the 3-dimensional image displayed by the screen of the mobile phone is magnified without chromatic aberration through the reflective mobile phone lens assembly.

\* \* \* \* \*